United States Patent [19]

Undin et al.

[11] 4,274,176
[45] Jun. 23, 1981

[54] VACUUM OPERATED DESOLDERING TOOL

[75] Inventors: Hans Undin, Akersberga; Hans Wiener, Täby, both of Sweden

[73] Assignee: Toolema AB, Stockholm, Sweden

[21] Appl. No.: 96,026

[22] Filed: Nov. 20, 1979

[51] Int. Cl.³ .............................................. A47L 5/20
[52] U.S. Cl. ....................................... 15/341; 228/20
[58] Field of Search ..................... 15/341, 344; 228/20

[56] References Cited

U.S. PATENT DOCUMENTS

| 3,537,124 | 11/1970 | Wallin | 15/341 |
| 3,818,539 | 6/1974 | Fortune | 15/341 |
| 3,862,468 | 1/1975 | Fortune | 15/341 |

FOREIGN PATENT DOCUMENTS 2438962  2/1975  Fed. Rep. of Germany ............ 228/20

Primary Examiner—Christopher K. Moore
Attorney, Agent, or Firm—Toren, McGeady and Stanger

[57] ABSTRACT

A tool for removing solder comprises a tubular body having a nozzle at one end thereof and a piston device arranged to reciprocate within the tubular body to produce a suction effect through the nozzle during a solder removing operation. The piston device includes a piston rod and a piston member slidably mounted on the rod with a spring operating to urge the piston member relative to the rod in a direction toward the nozzle and with a stop member limiting movement of the piston member in this direction.

8 Claims, 3 Drawing Figures

VACUUM OPERATED DESOLDERING TOOL

BACKGROUND OF THE INVENTION

The present invention relates generally to vacuum operated desoldering tools utilized for the purpose of solder removal. More particularly, the invention relates to a device of the type wherein a piston mechanism is mounted for reciprocal movement within a tubular body having a nozzle at one end thereof, with the piston mechanism operating to produce a suction effect through the nozzle to effect the solder removal operation.

Tools of the type to which the invention relates generally comprise a piston mechanism which includes a piston member mounted on the forward end of a piston rod for reciprocatory movement within the tubular body of the tool. Tension spring means within the tool operate to displace the piston member rearwardly through a suction stroke, the piston member being thus moved from a forward position thereof located adjacent the forward end of the tubular body. Interlocking means for holding the piston member in its forwardmost position against the force of the tension spring means are provided and operating means are also provided which release the interlocking means thereby bringing the piston member into its rearwardmost position.

A suction nozzle having a through-bore is secured in a readily detachable manner at the forward end of the tubular body and a cleansing needle which protrudes from the forward end of the piston rod and which will extend into the through-bore of the nozzle may also optionally be provided.

An example of such a tool, which will hereinafter be referred to as a tool "of the type specified" is described in greater detail in British Pat. No. 1,195,525 to one of the co-inventors.

The present invention is directed toward providing an improved tool of the type specified particularly with regard to the quality of the vacuum achieved.

In order to achieve an optimum vacuum, a satisfactory sealing effect must be maintained between the piston mechanism and the inner wall of the tubular body. Furthermore, a minimal "dead volume" between the forward or front face of the piston mechanism and the adjacent body must also be attained. The first exigency mentioned above is generally self evident. However, the second exigency relating to the requirement for a minimal "dead volume" may be better understood if it is considered that the greater the volume of remaining air which is captured forwardly of the piston mechanism when in its forwardmost position, the greater will be the dilution effects upon the vacuum which must be created when the piston member is moved rearwardly. Thus, with greater amounts of residual air, a lower suction effect will be achieved. The volume which is located between the forwardmost face of the piston mechanism when at its forwardmost position and the inner face of the front wall of the tubular body will hereinafter be referred to as "the forward chamber". Ideally, the volume of the forward chamber when the piston mechanism is moved to its forwardmost position should be reduced to zero.

Molten solder which is drawn into the apparatus solidifies quickly and forms solid flakes or the like which will collect in the forward chamber and which will eventually prevent the piston mechanism from being brought to its intended forwardmost position. As a result, a greater amount of residual air will be retained in the forward chamber and the detrimental effects caused thereby will include the circumstance that the interlocking means will not longer operate dependably upon the piston rod of the piston mechanism. The reason for this is that the piston rod must be provided with engaging means for the interlocking means at a rearward location opposite the engagement means when the piston rod is in its forwardmost position. Because the accumulated solidified solder prevents the piston member from moving to its intended forwardmost position, the piston rod, which in accordance with prior art structures has conventionally been solidly attached or fixed to the piston member, is prevented from occupying its intended position relative to the interlocking means which thus can no longer act reliably.

It has been proposed in the prior art, e.g. British Pat. No. 1,215,548, to construct the piston member in the form of a long cylindrical plunger having arranged at its forward end a resilient sealing disk, with a stiff compression disk being formed forwardly thereof. The compression disk is coupled by means of an auxiliary rod to a conventional tension spring means of the apparatus so that when the plunger occupies its forwardmost position and the tension spring means is fully stretched, the resilient sealing disk will be axially compressed between the compression disk and the front face of the plunger with greater force than would otherwise be the case. Thus, an improved sealing effect is achieved as a result of the greater radial expansion of the compression disk which does not change its position relative to the plunger on the front face thereof where the resilient sealing disk fits at all instances.

The present invention is directed toward providing a tool of the type specified which will generally exhibit enhanced operating characteristics.

SUMMARY OF THE INVENTION

Briefly, the present invention may be described as a vacuum operated desoldering tool which comprises a tubular body, means defining a nozzle at one end of the tubular body, and piston means mounted for reciprocal movement within the tubular body to produce a suction effect through said nozzle. In accordance with the present invention, the aforementioned problems arising in the prior art with regard to the forward chamber of the tool are obviated or mitigated by forming the piston means to include a piston rod having a piston member which is slideably mounted on the piston rod for movement relative thereto. Spring means are operably interposed between the piston rod and the piston member to apply a spring force therebetween urging the piston member relative to the piston rod in a direction toward the nozzle. Stop means are interposed between the piston rod and the piston member to limit the movement of the piston member relative to the piston rod in a direction toward the nozzle.

Thus, the piston member is mounted to be axially slideable on the piston rod and it is urged by a compression spring means into its forwardmost position which is defined or determined by a stop element affixed to the piston rod. Conveniently, when the piston member is formed to comprise a resilient sealing disk, this disk is arranged between a forward retainer member adapted to slide on the piston rod and to be stopped by the stop member, and a rear retainer member adapted to slide on the piston rod and to receive the forward end of the compression spring means, the rear end of which is anchored at a rear stop member provided on the piston rod at a distance from the front stop member, said distance exceeding the combined length or thickness of the two retainer members, of the resilient sealing member in its uncompressed state and of the tension spring means in its fully compressed state.

By this arrangement, the piston rod may always be pushed forwardly into its predetermined forwardmost position and the interlocking means will reliably engage their corresponding engagement means because the solid obstacles which might possibly accumulate in the forward chamber will only cause the piston member to be pushed somewhat rearwardly on the piston rod against the action of the compression spring means. At the same time, the resilient sealing disk will be constantly affected by the compression spring means and will thus be radially expanded for improved sealing action.

Practical experience has shown that resilient sealing disks trapped between rigid retainer members with a diameter only slightly less than that of the resilient disk tend to lose their optimum sealing effect sooner than would otherwise be the case. When, however, at least one of the rigid retainer members is formed with a diameter which is smaller by at least 30 percent of the diameter of the sealing disk this drawback is largely reduced. The probable reason for this effect is the possibility of bending the sealing disk along a larger radius.

Moreover, it has been found that from the point of view of airflow effects, it is advantageous to provide at least one of the two faces which limit the forward chamber in the radial direction with a substantially toroidal groove where the solidified solder particles may collect. Such toroidal grooves may be formed on the rear face of the front wall of the tubular body and/or on the front face of the piston member, for example, on the front face of a forward retainer member formed as part of the assembly of the piston member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
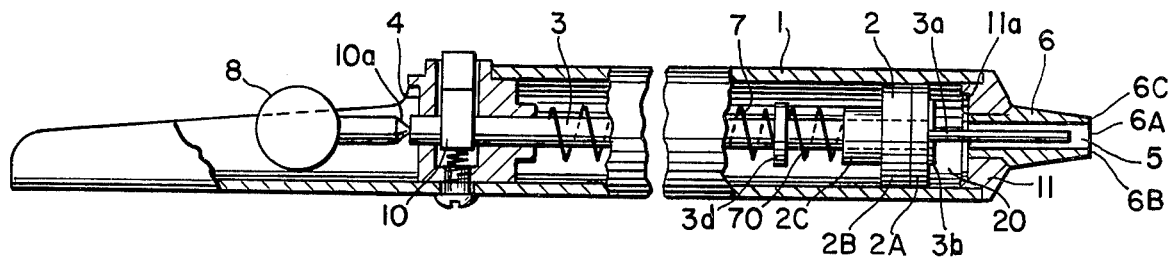
FIG. 1 is a partially sectioned, partially broken away side view of a tool in accordance with the present invention.

Referring now to the drawings, wherein like reference numerals are used to refer to similar parts throughout the various figures thereof, there is shown in FIG. 1 a first embodiment of the invention comprising a tubular body or cylinder 1 having a piston mechanism comprising a piston member 2 and a piston rod 3 mounted for reciprocal movement therein. The piston rod 3 projects rearwardly of the tubular body 1 through a plug 4 with a ball handle 8 being provided at the rear end of the tool. At the forward end of the piston rod, the body 1 is provided with a nozzle member 6. The nozzle member 6 is fixed in the front or forward end of the body 1 by means of a front wall member 11.

The nozzle member 6 is formed with a bore 5 extending therethrough and a rod shaped cleansing needle 3a, which may be optionally provided, extends into the bore 5. A helical tension spring 7 is connected between the plug 4 and a rearward stop element 3d fixedly mounted on the piston rod 3, with the spring 7 being anchored at both ends. The piston rod 3 may be locked in position by a readily releasable locking device 10.

In the position shown in FIG. 1, the piston rod 3 is located a slight distance rearwardly from its forwardmost position which may be achieved and secured when engaging means 10a on the piston rod 3 enters into engagement with the locking device 10. The engaging means 10a, which in the embodiment of FIG. 1 comprises a circumferential groove, forms, together with the locking device 10 the interlocking means of the invention. With the piston member 2 moved to its forwardmost position, a forward chamber 20 located between the piston member 2 and the front wall member 11 will have its volume virtually reduced to zero.

An inner wall 6A of the bore 5, and possibly also a narrow annular front surface 6B as well as an adjacent zone 6C on the outer wall of the nozzle 6 are preferably coated with a layer of tetrafluorethylene or with a similar material having an elevated fusion temperature and a low coefficient of friction.

Figure 2:
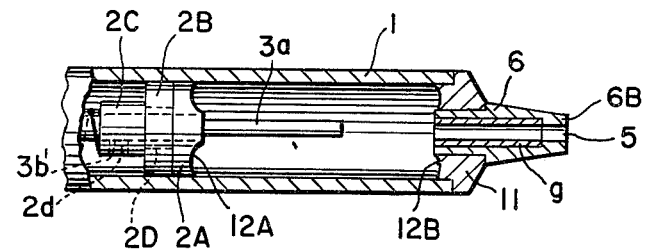
FIG. 2 is a partial sectional view taken through the front portion of a tool formed in accordance with another embodiment of the invention.

In the embodiment as shown in FIG. 2, this coating may be replaced by the insertion into the bore 5 of a thin-walled tube 9 of appropriate material. In this case, expediently, the tube 9 does not extend as far as the front surface 6B, but terminates a distance short of this surface in order to avoid heat damage. The inner wall of the thin-walled tube 9 is arranged to be flush with the inner wall of the uncovered forward portion of the bore 5. The piston member 2 is shown in FIG. 2 in a more retracted position than the position in which it is shown in FIG. 1.

According to FIGS. 1 and 2, the piston member 2 consists of a rigid forward retainer disc 2A and a rigid rearward retainer disc 2C. Sandwiched between the two retaining discs is a resilient sealing disc 2B. The forward retaining disc 2A has a diameter only slightly smaller than that of the sealing disc 2B, whereas the rearward retaining disc 2C has a diameter which is at least 30 percent smaller than the diameter of the sealing disc 2B. All three discs 2A, 2B, and 2C, are provided with coaxial central bores within which the piston rod 3 may readily slide. Forwardly of the forward retaining disc 2A, there is fixedly attached to the piston rod 3 a stop element 3b which may be formed as a transverse pin or the like. The forward stop element 3b is shown in the drawing for the purposes of clarity on a scale larger than the size with which it may actually be formed. Expediently, a corresponding groove 11a may be arranged in the inner face of the front wall member 11 for reception therein of the forward stop element 3b when the piston rod 3 is in its forwardmost position.

Between the rear face of the rearward retaining disc 2C and the rear stop element 3d, there is mounted on the piston rod 3 a helical compression spring 70. The sealing disc 2B is constantly expanded radially by the effect of the compression spring 70. When the piston rod 3 reaches its forwardmost position, any solid obstacles which are present in the forward chamber 20 will operate to push backwardly the entire piston member 2. However, such obstacles will not prevent the piston rod 3 from itself reaching its predetermined forwardmost position wherein it is securely locked in place by the action of the interlocking means 10, 10a.

In the embodiment of FIG. 2, there is avoided any tendency to prevent the piston rod 3 and the piston member 2 from reaching their forwardmost position as a result of the forward element 3b impinging against particles of dirt or similar materials. The forward stop member is replaced by a transverse pin 3b' located within a narrow axial slot 2d in the rearward retention disc 2C which, for the purposes involved, is made somewhat thicker than in the embodiment according to FIG. 1. In FIG. 2, the pin 3b' is shown in contact with the rear end of the slot 2d. The extension of the slot 2d defines the extension with which the piston member 2 may be pushed rearwardly on the piston rod 3. In this embodiment, the forward retaining disc 2A and the rearward retaining disc 2C are rigidly connected together by means of a bridging tube 2D or by pins penetrating through the resilient sealing disc 2B. The axial compression exerted on the resilient sealing disc 2B is in this case defined by the bridging elements and not by the compression spring 70.

In the front face of the forward retaining disc 2A, and in the rear face of the front wall member 11, respectively, there may be arranged shallow toroidal grooves 12A, 12B, which promote favorable air circulation when the molten solder is drawn into the forward chamber and which at the same time provide "pockets" for collected solidified particles. Alternatively, two or more concentric shallow toroidal grooves may be provided in the respective surfaces shown.

Figure 3:
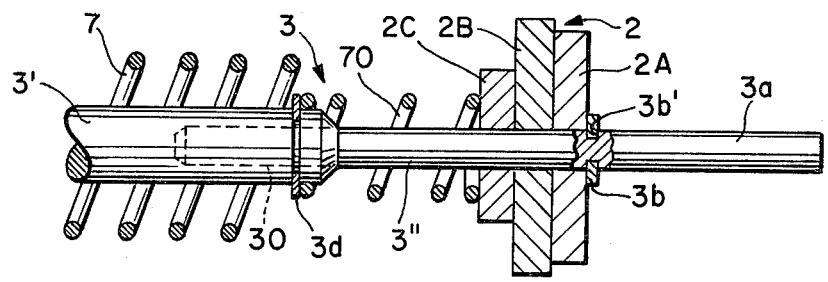
FIG. 3 is a partially sectioned side view showing an additional embodiment of the invention.

In the embodiment according to FIG. 3, the piston rod 3 is provided with a forward extension 3" with a reduced diameter corresponding to that of the cleansing needle 3a. Although this cleansing needle 3a and the extension 3" are integrally formed as a single piece, and although the remaining portion 3' of the piston rod is also formed to be integral with these parts, it will be readily understood that functionally the piston rod 3 is composed of two portions 3' and 3" both of which are located rearwardly of the forwardmost position of the piston means 2 defined by the frontward stop member 3b, and the cleansing needle 3a extends forwardly of this position. Stop members 3b and 3d are advantageously provided as circlip rings engaging within grooves such as a groove 3b' in the piston rod 3', 3". The two portions 2', 3" of the piston rod may consist of separate members joined together, for example, by means of a threaded connection 30, as shown in FIG. 4, or the piston rod with its two diameters can be formed as a single integral member.

While specific embodiments of the invention have been shown and described in detail to illustrate the application of the inventive principles, it will be understood that the invention may be embodied otherwise without departing from such principles.

What is claimed is:

1. A vacuum operated desoldering tool comprising a tubular body, means defining a nozzle at one end of said tubular body, piston means mounted for reciprocal movement within said tubular body to produce a suction effect through said nozzle, said piston means including a piston rod and a piston member slideably mounted on said piston rod for movement relative thereto, spring means operably interposed between said piston rod and said piston member applying a spring force urging said piston member relative to said piston rod in a direction toward said nozzle, and stop means interposed between said piston rod and said piston member to limit the movement of said piston member relative to said piston rod in a direction toward said nozzle.

2. A tool according to claim 1, wherein said piston member comprises a forward retaining member, a rearward retaining member and a resilient sealing disc sandwiched therebetween, said spring means being positioned to bear against said rearward retaining member.

3. A tool according to claim 2, wherein said rearward retaining member is slideable relative to said resilient sealing member so that the effect of said spring means is also transmitted to the resilient sealing member for compression thereof.

4. A tool according to claim 3, wherein said piston rod comprises a forward extension having a diameter smaller than the diameter of said piston rod with said piston member being slideably mounted on said extension.

5. A tool according to claim 2, wherein said stop means comprise a stop element located adjacent said rearward retaining member and arranged for cooperation therewith.

6. A tool according to claim 1, wherein said piston member comprises a front face and wherein said tubular body comprises a front wall having an inner face arranged in opposing relationship with said front face of said piston member, with at least one of said inner faces of said front wall and said front face of said piston member being provided with at least one toroidal groove.

7. A tool according to claim 1, adapted to draw molten solder through said nozzle by movement of said piston means away from said nozzle to produce said suction effect drawing said molten solder into said tubular body through said nozzle, said piston member being mounted on said piston rod in a manner whereby said piston member may move in a direction away from said nozzle when said piston rod is moved toward said nozzle, said movement of said piston member being caused by solidified solder particles retained within said tubular body between said nozzle and said piston member which are abutted by said piston member during forward movement of said piston rod.

8. A tool according to claim 1, wherein said nozzle is provided with a through-bore having an inner wall, with at least a portion of said inner wall being provided with a layer of material having an elevated fusion temperature and a low friction coefficient.

* * * * *